Patented Mar. 7, 1939

2,149,304

UNITED STATES PATENT OFFICE 2,149,304

LYOPHILIC BIOLOGICALLY ACTIVE SUBSTANCES

Peter Masucci, Norwood, Pa., assignor to Sharp & Dohme, Incorporated, Philadelphia, Pa., a corporation of Maryland No Drawing. Application April 20, 1936, Serial No. 75,420

10 Claims. (Cl. 167—78)

This invention relates to improvements in the preservation of such biologically active substances as sera, complements, protein solutions, and other labile biological substances containing considerable amounts of carbon dioxide, free or combined. It includes a new process for the production of such biologically active substances in a stable state, as well as new products which comprise such biologically active substances in a stable state capable of storage without deterioration. It relates more particularly to processes in which such biologically active substances are frozen, dehydrated from the frozen state under a high vacuum, and sealed under a high vacuum, the substances being so treated during the process that the desiccated product so produced when restored to a liquid state by the addition of water has properties substantially the same as the original material, and to the new desiccated products produced from the biologically active substances so treated.

Sera and other biologically active substances are normally characterized by a relatively high water content. Such products do not keep well, and deteriorate more or less rapidly on standing. Various processes have been suggested for removing water from such substances to produce a desiccated product, with improved keeping qualities. Some of these processes involve freezing such biologically active substance and dehydrating it while in a frozen condition by applying to it a high vacuum. One process which has been proposed is carried out by freezing the serum or the like in a mixture of ice and salt and subliming the water from the frozen mass in a vacuum over sulfuric acid or phosphorus pentoxide. According to another method, the serum or other substance is frozen in a mixture of ice and salt, and desiccated in a high vacuum produced by means of a condenser cooled with a mixture of carbon dioxide snow and an organic solvent. Dr. Reichel of the Mulford Laboratories has developed a process in which the serum or other substance is rapidly frozen by exposing it to indirect contact with a freezing mixture maintained at about −70 to −80° C., with dehydration of the frozen material under a high vacuum produced by means of a condenser cooled by a mixture of acetone and carbon dioxide snow.

In such processes, the biologically active substance is desiccated, with the production of a dry serum or similar substance having a water content of but a few percent. They may be restored, more or less completely, to their original state by the addition of water in proper amounts to them; but while they are maintained in a desiccated state they are much more stable than the original products, and may be kept in storage for relatively long periods of time without deterioration.

I have found, when processes such as those referred to above are carried out, and a biologically active substance is desiccated to produce a product of improved keeping properties, the product, when restored by the addition of water, has a different pH value from the initial material, and is considerably more alkaline than the initial material. For example, I have found that if a liquid serum having a pH of about 7.6, which is a normal pH value for serum, is rapidly frozen by indirect exposure to a refrigerant maintained at about −70 to −80° C., and then is desiccated by the application of a high vacuum, the product, when restored by the addition of water, has a pH value of about 8.9. In other words, the restored serum is much more alkaline than the initial serum.

This increase in alkalinity which follows the desiccation and restoration of sera and other biologically active substances is objectionable for several reasons. It is well known that biologically active substances in general deteriorate much more rapidly at relatively high pH values, such as pH values of 8.9, than they do at normal pH values, such as pH values of 7.6. At the higher pH values, anti-bodies become unstable, complement is rapidly deactivated by heat, serum tends to lose its hemolytic activity rapidly, etc. Further, sera having pH values of 8.9, or pH values much in excess of 7.6, when injected into the body are much more prone to be irritating and to produce disagreeable reactions than are sera having a pH value in the neighborhood of the normal pH value of tissues or blood, which is about 7.4.

I believe that the increase in the pH value of the biologically active substances when desiccated as described above, is due to the removal of carbon dioxide from the substance under the influence of the vacuum. Biologically active substances, such as sera, contain considerable quantities of carbon dioxide. Part of this carbon dioxide is present as free carbon dioxide, that is, as carbonic acid, and some is present in the form of carbonate and bicarbonate. All of these forms of carbon dioxide are in equilibrium with each other, with the free carbon dioxide, and with the other salts and compounds present in the biological substance. Thus there is an equilibrium between free carbon dioxide, carbonic acid, sodium bicarbonate, sodium carbonate, sodium phosphate, sodium proteinate, free proteins, etc. If any carbon dioxide is removed from the substance, the entire equilibrium is upset, the various compounds which contain combined carbon dioxide tend to set free some carbon dioxide to replace that removed, and the alkalinity of the substance as a whole is increased. When the substance is frozen and subjected to the action of a high vacuum to remove the water, carbon dioxide is removed at the same time, with a consequent increase in the alkalinity or pH value of the substance.

Substances so produced, when restored by the addition of water, have such a high alkalinity that they must be used almost immediately, or quite soon after restoration, as their biological activity decreases rapidly and appreciably. The restored substances do not have either the stability or keeping properties of the original hydrated substance. Accordingly, the present invention is intended to provide a process by which biologically active substances may be frozen and desiccated by the application of a high vacuum, such that the desiccated substances, when restored by the addition of water, have a pH value approximating that of the initial substance, and have keeping qualities and resistance to deterioration almost the same as the original substances. In carrying out this process, the biologically active substance is treated with a suitable acidic or amphoteric electrolyte before it is frozen, and before it is desiccated. I have found that I can add to biologically active substances, such as sera, sufficient amounts of acid, acid buffer salts or ampholytes to insure that the substances, when restored, will have a pH in the neighborhood of 7.6, or a normal pH, without appreciably impairing the activity or biological properties of the substances. This is largely due to the fact that biologically active substances, while nearly neutral, have the property of neutralizing considerable amounts of acid without becoming excessively acid. For example, serum, which has a pH of about 7.6, can be treated with considerable amounts of sodium acid phosphate, in a solution having a pH of about 4.5 (25%) without reducing the pH of the serum much below 7.0. Accordingly, in carrying out my invention, I add to the biologically active substances before freezing and before desiccation, a sufficient amount of an acidic or amphoteric electrolyte solution to insure that the desiccated product, when restored by the addition of water, will have a pH in the neighborhood of 7.6.

In carrying out this process, it is important that the serum be frozen before it is desiccated. When the treated serum is frozen, the added electrolyte becomes fixed, and does not act as an electrolyte or as an acid during the desiccation. Nor does it become concentrated during the desiccation process, as it would if the serum were dried from the liquid state, and the presence of a concentrated solution of the electrolyte, which might denature the serum, is avoided.

The acidic or amphoteric electrolyte which is added to the biologically active substance should be one which is compatible with the other components of the substances, and which does not cause denaturation or destroy the biological activity of the substances. A buffer salt which I have found particularly advantageous for use is sodium acid phosphate. Phosphates are normal constituents of most biologically active substances, particularly of sera, and the addition of sodium acid phosphate to the substances does not denature them. Also, the electrolyte used should be one which is not decomposed, or effected by the application of a vacuum, so that it maintains its property of reducing the pH value of the substances after the application of a vacuum.

Further, the electrolyte which is added should not be one which binds the free carbon dioxide present in the biologically active substance, but should be one which permits its escape as with untreated substances, so that the carbon dioxide escapes in the normal manner, with an increase of pH of the substance which has been slightly acidified by the addition of the electrolyte. Thus, when a biologically active substance is treated with sodium acid phosphate before freezing, and then is frozen and desiccated by the application of a high vacuum, the free carbon dioxide in the substance escapes much as it does with a substance which has not been treated with sodium acid phosphate, so that, when the desiccated substance is restored by the addition of water, its pH is about normal.

The invention will be further illustrated by the following examples, although it is not limited thereto.

*Example 1.*—To 1000 cc. of a sterile diphtheria anti-toxic serum, which may contain a phenolic preservative if desired, is added 50 cc. of a 25% solution of sodium acid phosphate, $NaH_2PO_4.H_2O$. The concentration of sodium acid phosphate in the resulting solution is about 1.25%, and the serum has a pH value of about 6.9, as compared with a pH of about 7.6 for the original serum.

The serum so treated is then frozen by immersing a container containing it in a suitable refrigerant. The freezing may be accomplished by immersing the container in an ice-salt bath at $-10$ to $-20°$ C., but I prefer to freeze the serum rapidly by immersing the container in a refrigerant maintained at $-70$ to $-80°$ C. such as a mixture of acetone and carbon dioxide snow.

The frozen material is then desiccated while maintained in a frozen state by subjecting it to the action of a high vacuum, as by placing the container in a suitable vacuum jar over sulfuric acid or calcium chloride, or other dehydrating agent, or the container may be connected in a suitable manner to a condenser cooled by a mixture of acetone and carbon dioxide snow or other suitable low temperature refrigerant, and evacuated by means of a vacuum pump. Preferably, the latter method is used, and the container is sealed while the vacuum is maintained.

The serum so desiccated when restored to its original volume of 1000 cc. by the addition of the proper amount of distilled water has a pH of 7.6, which is about the same as that of the original serum. Its resistance to deterioration, and its biological properties, are about the same as that of the original serum. The restored serum shows no demonstrable loss in potency. A similar serum, treated in exactly the same manner, but without the addition of the sodium acid phosphate solution, when restored to its original volume by addition of distilled water, has a pH of about 8.9, and deteriorates rapidly.

In the following examples, the serum, after the addition of the electrolyte, was dessiccated and restored as described in Example 1. A control sample of serum, having an initial pH of 7.7, when desiccated and restored in the same manner, had a pH of 8.9.

*Example 2.*—To 100 cc. of serum is added 5 cc. of a 0.1 molar solution of citric acid. The treated serum has a pH of 6.7, and after desiccation and restoration, the restored serum has a pH of 7.4.

Example 3.—To 100 cc. of serum is added 10 cc. of a solution containing 21 grams of citric acid and 100 cc. of normal caustic soda solution per liter. The treated serum has a pH of 6.5, and after desiccation and restoration, the restored serum has a pH of 7.0.

Example 4.—To 100 cc. of serum is added 10 cc. of a solution containing 42 grams of citric acid and 400 cc. of normal caustic soda solution per liter. The treated serum has a pH of 6.7, and after desiccation and restoration, the restored serum has a pH of 7.4.

Example 5.—To 100 cc. of serum is added 10 cc. of a 10% solution of glycine. The treated serum has a pH of 7.7, and after desiccation and restoration, the restored serum has a pH of 8.2.

Example 6.—To 100 cc. of serum is added 4 cc. of a 10% solution of potassium acid phthalate. The treated serum has a pH of 6.1, and after dessiccation and restoration, the restored serum has a pH of 7.0.

Example 7.—To 100 cc. of serum is added 10 cc. of a 1% solution of acetic acid. The treated serum has a pH of 6.4, and after desiccation and restoration, the restored serum has a pH of 7.1.

Example 8.—To 100 cc. of serum is added 5 cc. of 0.1 molar tartaric acid solution. The treated serum has a pH of 6.7, and after dessication and restoration, the restored serum has a pH of 7.4.

Example 9.—To 100 cc. of serum is added 1.2 cc. of normal hydrochloric acid. The treated serum has a pH of 7.0, and after desiccation and restoration, the restored serum has a pH of 7.7.

The amount of added electrolyte required to produce the desired reduction in the pH of the restored products varies somewhat, both with the particular electrolyte selected, and with the serum treated. Strongly acid electrolytes are required in lesser amounts than weakly acid electrolytes, or amphoteric electrolytes. Serum containing relatively large proportions of protein require the addition of more electrolyte to reduce their pH on restoration, because the protein acts as a buffer and resists any change in pH.

Among the electrolytes which may be used to produce the reduction in pH of the restored products, are mineral acids, such as hydrochloric acid, inorganic acid salts, such as sodium acid phosphate and sodium acid sulphate, organic acids, such as citric acid, tartaric acid, acetic acid, etc., and their partially neutralized products, such as acid sodium citrate, acid sodium tratrate, acid potassium phthalate, etc., and amphoteric electrolytes, such as glycine. Mineral acids, such as hydrochloric acid, should be added to the liquid biologically active substances cautiously, and preferably in diluted form, to avoid denaturation.

The desiccated products, containing the added electrolyte, are new products. The may contain various amounts of added electrolyte, the amount added depending upon the amount required to insure the obtaining of a product having a normal pH value, or a pH value as close to normal as desired, when restored by the addition of water. For sera, using sodium acid phosphate, the amount of sodium acid phosphate which is used generally is about 13% of the total solids present in the sera. This amount may be varied, however, for various biologically active substances, it being merely necessary to add sufficient of the salt to insure a normal pH value in the restored product.

I claim:
1. In the process of producing a desiccated serum by freezing such substance and subjecting it to a high vacuum to remove water, the step of adding a material of the class consisting of acidic and amphoteric electrolytes to the substance before freezing.

2. In the process of producing a desiccated serum by freezing such substance and subjecting it to a high vacuum to remove water, the step of adding sodium acid phosphate to the substance before freezing.

3. In the process of producing a desiccated serum by freezing such substance and subjecting it to a high vacuum to remove water, the step of adding an organic acid to the substance before freezing.

4. In the process of producing a desiccated serum by freezing such substance and subjecting it to a high vacuum to remove water, the step of adding about 1.25% of sodium acid phosphate to the substance before freezing to insure that the desiccated substance, on restoration by the addition of water, has a pH about normal.

5. As a new product, a desiccated serum containing an added material of the class consisting of acidic and amphoteric electrolytes in intimate admixture, said product being obtained by freezing the liquid serum after the addition of the material of the class consisting of acidic and amphoteric electrolytes and removing water therefrom by subjecting the frozen material to a high vacuum.

6. As a new product, desiccated serum containing added sodium acid phosphate in intimate admixture, said product being obtained by freezing such serum after the addition of sodium acid phosphate and removing water therefrom by subjecting the frozen material to a high vacuum.

7. As a new product, desiccated serum containing an added organic acid in intimate admixture, said product being obtained by freezing such serum after the addition of an organic acid and removing water therefrom by subjecting the frozen material to a high vacuum.

8. As a new product, a desiccated serum containing about 13% of added sodium acid phosphate in intimate admixture, the product being obtained by freezing the liquid serum after the addition of about 1.25% of sodium acid phosphate and removing water therefrom by subjecting the frozen material to a high vacuum, such desiccated serum, on restoration to a liquid state by the addition of water, having a pH about normal.

9. In the process of producing a desiccated serum by freezing such substance and subjecting it to a high vacuum to remove water, the step of adding sufficient citric acid to the substance before freezing to insure that the desiccated substance, on restoration by the addition of water has a pH about normal.

10. As a new product, desiccated serum containing added citric acid in intimate admixture, said product being obtained by freezing such serum after the addition of citric acid and removing water therefrom by subjecting the frozen material to a high vacuum.

PETER MASUCCI.